(12) United States Patent
Gambini (10) Patent No.: US 10,735,035 B1
(45) Date of Patent: Aug. 4, 2020

(54) SENSOR CIRCUIT WITH TRACKING FILTER AND LEAKAGE REJECTION

(71) Applicant: Apple Inc., Cupertino, CA (US)

(72) Inventor: Simone Gambini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/298,610

(22) Filed: Mar. 11, 2019

(51) Int. Cl.
  H04L 27/00 (2006.01)
  H04B 1/04 (2006.01)
  G01S 7/292 (2006.01)
  G01S 7/03 (2006.01)
  H04B 1/525 (2015.01)

(52) U.S. Cl.
  CPC ............... H04B 1/0475 (2013.01); G01S 7/03 (2013.01); G01S 7/292 (2013.01); H04B 1/525 (2013.01)

(58) Field of Classification Search
  CPC ......... H04B 1/0475; H04B 1/525; G01S 7/03; G01S 7/292
  USPC ........................................ 375/295, 316, 219
  See application file for complete search history.

(56) References Cited

U.S. PATENT DOCUMENTS

| | | | |
|---|---|---|---|
| 5,444,864 A | 8/1995 | Smith | |
| 7,711,329 B2 | 5/2010 | Aparin et al. | |
| 8,836,601 B2 | 9/2014 | Sanford et al. | |
| 9,019,150 B2 | 4/2015 | Alalusi | |
| 9,383,441 B2 | 7/2016 | Younis | |
| 2015/0088221 A1* | 3/2015 | Barr-Cohen | A61N 1/362 607/33 |
| 2016/0109565 A1* | 4/2016 | Hyun | G01S 13/343 342/52 |
| 2018/0309474 A1 | 10/2018 | Cheung et al. | |
| 2019/0004155 A1 | 1/2019 | Eber et al. | |

* cited by examiner

*Primary Examiner* — Zewdu A Kassa
(74) *Attorney, Agent, or Firm* — Kowert, Hood, Munyon, Rankin & Goetzel, P.C.

(57) ABSTRACT

A sensor circuit included in a computer system may include multiple antennas, a control circuit, a mixer circuit, a transmitter circuit and a filter circuit. The control circuit may generate a baseband signal, which the mixer circuit may modulate using a modulation signal to generate a transmit signal. The transmitter circuit may transmit the transmit signal using a first antenna. The filter circuit may be configured to track a carrier frequency of the transmit signal and filter a reflected version of the transmit signal to generate an output signal.

19 Claims, 10 Drawing Sheets

SENSOR CIRCUIT WITH TRACKING FILTER AND LEAKAGE REJECTION

BACKGROUND

Technical Field

This disclosure relates to sensor circuits in computer systems and more particularly to radio frequency sensor circuit operation.

Description of the Related Art

Modern computer systems may perform certain tasks or operations in response to changes in the environments, in which the computer systems are located. For example, changes in ambient light may result in a computer system adjusted brightness of a display. Additionally, changes in temperature may result in a computer system adjusting a level processing being performed in order to maintain the computer system within designated thermal limits. In some cases, rapid changes in acceleration may result in the computer system taking certain actions to prevent damage to movable parts within the computer system.

To react to changes in environment, a computer system may include multiple sensor circuits designed to detect various effects or situations. For example, such sensor circuit may include temperature sensors, acceleration sensors, ambient light sensors, and the like. The outputs of such sensor circuits may be polled by a processor or controller included in the computer system to determine what actions to perform.

Sensor circuits, such as those described above, may include any suitable combination of logic circuits, analog circuit, radio frequency circuits, and the like. In some cases, the sensor circuits may employ passive sensing techniques. Other sensor circuits may employ active sensing by transmitting signals and monitoring any returning signals.

SUMMARY OF THE EMBODIMENTS

Various embodiments of a sensor circuit are disclosed. Broadly speaking, a sensor circuit may include first and second antennas, and a control circuit that may be configured to generate a baseband signal. A transmitter circuit may be configured to transmit, via the first antenna, a transmit signal that is a modulated version of the baseband signal. A filter circuit, which tracks a carrier frequency of the transmit signal, may be configured to filter an echo signal received via a second antenna to generate an output signal, where the echo signal is a reflected version of the transmit signal. In another embodiment, the filter circuit may include a second mixer circuit which may be configured to, using the modulation signal, down convert the echo signal to generate an intermediate signal. In a different embodiment, the filter circuit further may include an amplifier circuit configured to amplify the intermediate signal to generate an output signal.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Many computer systems come equipped with various sensors that allow such computer systems to detect various effects and situations. For example, some mobile computer systems include sensors for detecting acceleration and deceleration, ambient temperature, humidity, and the like. In some cases, computer systems include sensors to determine a distance to a particular object. For example, sensors may be employed by a mobile computer system to determine a distance to a desktop computer system, router, etc.

Sensors used to determine a distance or range to an object may often employ radio frequency (RF) signals. Such signals may be transmitted and echo signals, i.e., versions of the transmitted signals reflected off of the object, may be received and analyzed to determine the distance or range to the object.

In some cases, the transmitted signals occupy a large RF bandwidth, but baseband signals used by the sensor circuit occupy a fraction of the RF bandwidth occupied by the transmitted signals. As a result, amplifier circuits included in the sensor circuit are designed to operate over the entire RF bandwidth occupied the transmitted signals making susceptible to interference. Additionally, in some applications it is difficult to isolate a transmitting antenna from a receiving antenna. Some of the transmitted signal may be directly received by the receiving antenna, which may be interpreted as a target or object at zero distance. The embodiments illustrated in the drawings and described below may provide techniques operating a sensor circuit that filters a received echo signal to remove unwanted interference as well as transmitted signals directly received by the receiving antenna, thereby improving the noise rejection of the sensor circuit and improving accuracy of sensor circuit's determination of the distance to a target.

Figure 1:
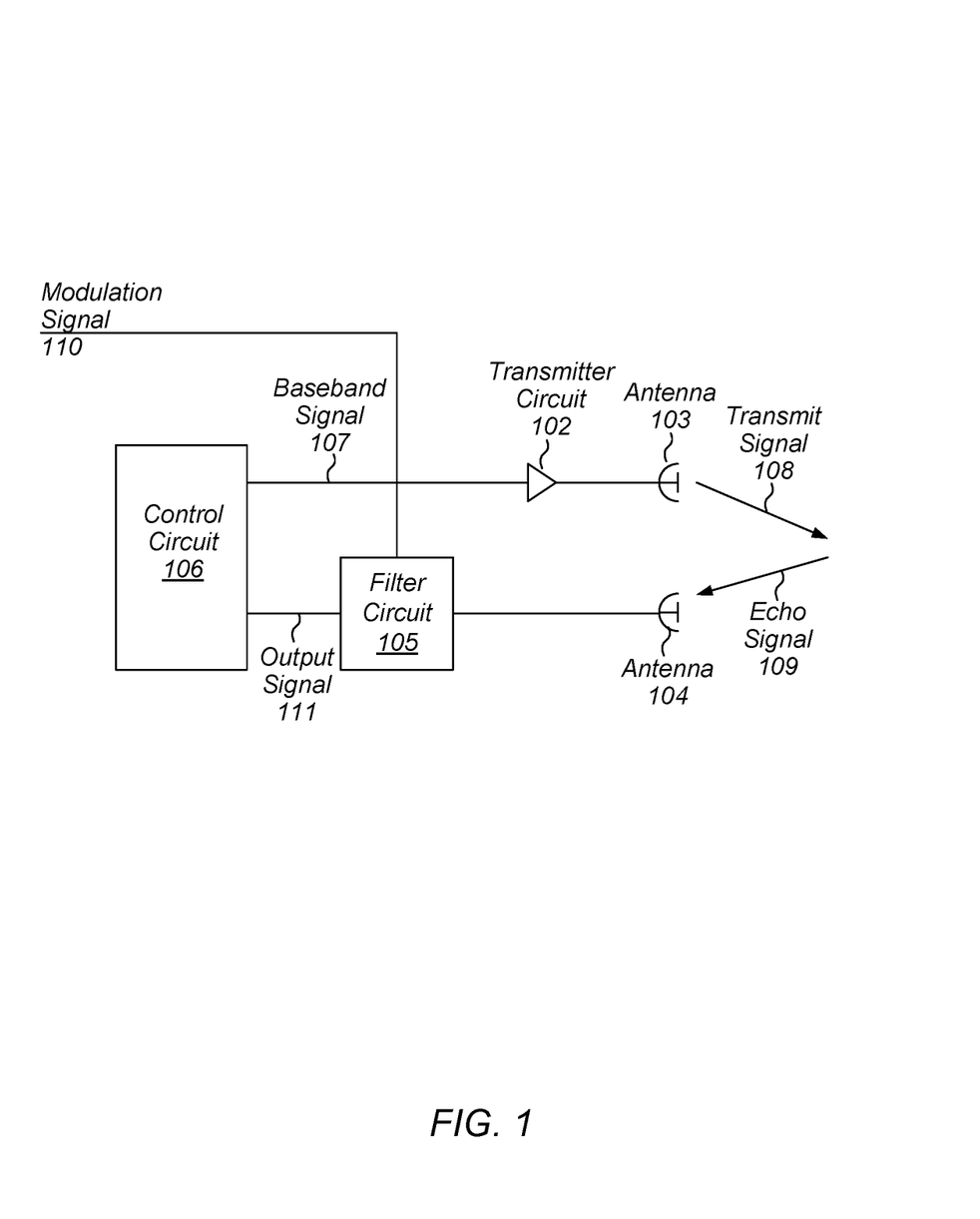
FIG. 1 is a block diagram of an embodiment of a sensor circuit.

A block diagram of a sensor circuit is depicted in FIG. 1. As illustrated, sensor circuit 100 includes transmitter circuit 102, antennas 103 and 104, filter circuit 105, and control circuit 106.

Control circuit 106 is configured to generate baseband signal 107. Transmitter circuit 102 is configured to transmit, via antenna 103, transmit signal 108. In various embodiments, transmit signal 108 may be a modulated version of baseband signal 107. It is noted that, in some embodiments, a mixer circuit configured to modulate baseband signal 107 to generate transmit signal 108 may be included between control circuit 106 and transmitter circuit 102. As described below in more detail, control circuit 106 may be further configured to generate a plurality of data bits using output signal 111, and determine, using the plurality of data bits, information indicative of a distance to an object that reflected the transmit signal to create the echo signal.

In various embodiments, echo signal 109 is a reflected version of transmit signal 108, generated when transmit signal 108 reflects from a particular object or target. Sensor circuit 100 receives echo signal 109 using antenna 104, and filter circuit 105 is configured to filter echo signal 109 to generate output signal 111. Filter circuit 105 may, in some cases, be a particular embodiment of a tracking filter that tracks a carrier frequency of transmit signal 108.

As described below in more detail, filter circuit 105 may include a mixer circuit configured to, using modulation signal 110, down convert the echo signal 109 to generate an intermediate signal. In some cases, filter circuit 105 may be configured to reject at least one frequency component of echo signal 109 generated by the antenna 104 directly receiving transmit signal 108 from antenna 103.

Figure 2:
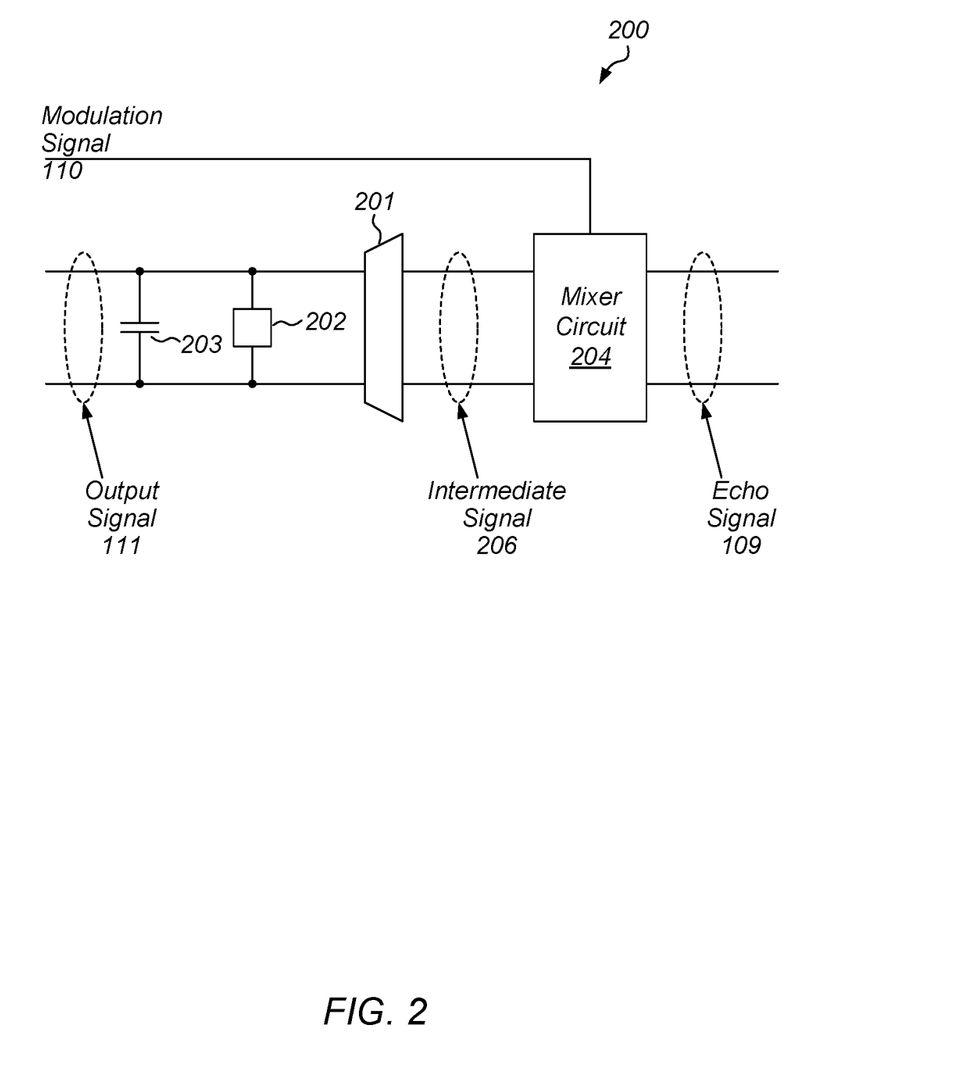
FIG. 2 illustrates a block diagram of an embodiment of a baseband amplifier circuit.

Turning to FIG. 2, a block diagram of an embodiment of a filter circuit is illustrated. In various embodiments, filter circuit 200 may correspond to filter circuit 105 as depicted in FIG. 1. As illustrated, filter circuit 200 includes amplifier circuit 201, impedance 202, capacitor 203, and mixer circuit 204. It is noted that in the embodiment illustrated in FIG. 2, each of echo signal 109, intermediate signal 206, and output signal 11 are differentially encoded on a pair of signal lines.

Mixer circuit 204 is configured to generate intermediate signal 206 using echo signal 109 and modulation signal 110. In various embodiments, a frequency of intermediate signal 206 may be a difference between a frequency of echo signal 109 and modulation signal 110, essentially shifting the frequency of echo signal 109 in a process commonly referred to as "heterodyning."

In various embodiments, mixer circuit 204 may be a particular embodiment of a passive mixer. As used herein, a passive mixer circuit is transparent input-to-output as well as output-to-input. For example, mixer circuit 204 may include any suitable combination of passive and active circuit elements that allow bi-directional flow of signals from input to output and vice versa.

Amplifier circuit 201 is configured to amplify intermediate signal 206 to generate output signal 111. In various embodiments, amplifier circuit 201 may be a particular embodiment of a differential amplifier or other suitable circuit configured to generate an output signal whose magnitude is represented as a difference in voltage levels of two signal lines. Amplifier circuit 201 may, in other embodiments, be single-ended at generate output signal 111 based on the magnitude of echo signal 109 relative to a ground reference or ground supply signal. In some cases, amplifier circuit 201 may be classified as a high impedance amplifier having allowing only leakage current on its inputs. As illustrated, the magnitude of output signal 111 is a voltage difference between the signal lines for intermediate signal 206 multiplied by a gain factor of amplifier circuit 201.

In various embodiments, amplifier circuit 201 may include multiple transconductance elements or other gain devices. For example, amplifier circuit 201 may include multiple metal-oxide semiconductor field-effect transistors (MOSFETs), bipolar transistors, or other devices compatible with any other suitable semiconductor manufacturing process used to fabricate sensor circuit 100.

The combination of mixer circuit 204 and amplifier circuit 201 may perform as a narrowband filter whose center frequency tracks in the carrier frequency of transmit signal 108. As used herein, filter circuit whose center frequency tracks changes in frequency of a particular signal (also referred to as a "tracking filter") refers to a filter circuit whose center frequency changes, after a time period, a change in the frequency of the particular signal. The response time of a tracking filter can be quite rapid. For example, in some embodiments, the center frequency of a tracking filter can change within several nanoseconds of a change in the frequency of the particular signal.

In some cases, the width of the narrowband filter formed by the combination of mixer circuit 204 and amplifier circuit 201 can be as small as several hundred kilohertz. An example, of the transfer function of filter circuit 200 is described below in more detail in regard to FIG. 6. By employing such a narrowband filter, the ability of sensor circuit 100 to reject interference from other sources (e.g., radios) is improved. Moreover, using the combination of mixer circuit 204 and amplifier circuit 201, further improves the linearity of the receiver portion of sensor circuit 100.

Impedance 202 is coupled between the output signal lines of amplifier circuit 201. In various embodiments, impedance 202 may be a particular embodiment of a resistor and may use as part of an impedance matching network (that may include capacitor 203) that is employed to match the output impedance of amplifier circuit 201 to input impedances in control circuit 106. In some cases, reactive circuit elements, e.g., inductors, may be included in impedance 202. Although only a single impedance is depicted in FIG. 2, in other embodiments, any suitable number of impedances may be employed.

Capacitor 203 is coupled between the output signal lines of amplifier circuit 201. In various embodiments, capacitors 203 may be part of an impedance matching network for amplifier circuit 201, or a passive filter circuit on the output of amplifier circuit 201. Although only a single capacitor is shown in the embodiment of FIG. 2, in other embodiments, any suitable number of capacitors may be employed.

Both impedance 202 and capacitor 203 may, in some embodiments, be fabricated on a same integrated circuit as amplifier circuit 201 and mixer circuit 204. In other embodiments, impedance 202 and capacitor 203 may be fabricated on a different integrated circuit than amplifier circuit 201 and mixer circuit 204. In some cases, impedance 202 and capacitor 203 may be discrete devices coupled to an integrated circuit that includes amplifier circuit 201 and mixer circuit 204.

In some cases, antenna 104 may not be adequately isolated from antenna 103. When this occurs, antenna 104 may directly receive transmit signal 108 without any reflection from a target or other object in a process commonly referred to as "leakage." In such cases, the signal received by antenna 104 is a composite of transmit signal 108 and echo signal 109. Such transmit leakage may appear as a DC of low frequency tone at the input of filter circuit 105. In some cases, a low noise amplifier and mixer circuit may process this tone, which is removed in the baseband using AC coupling. The use of such coupling may result in low noise amplifier and mixer circuit operating at a lower gain with degraded sensitivity.

Figure 3:
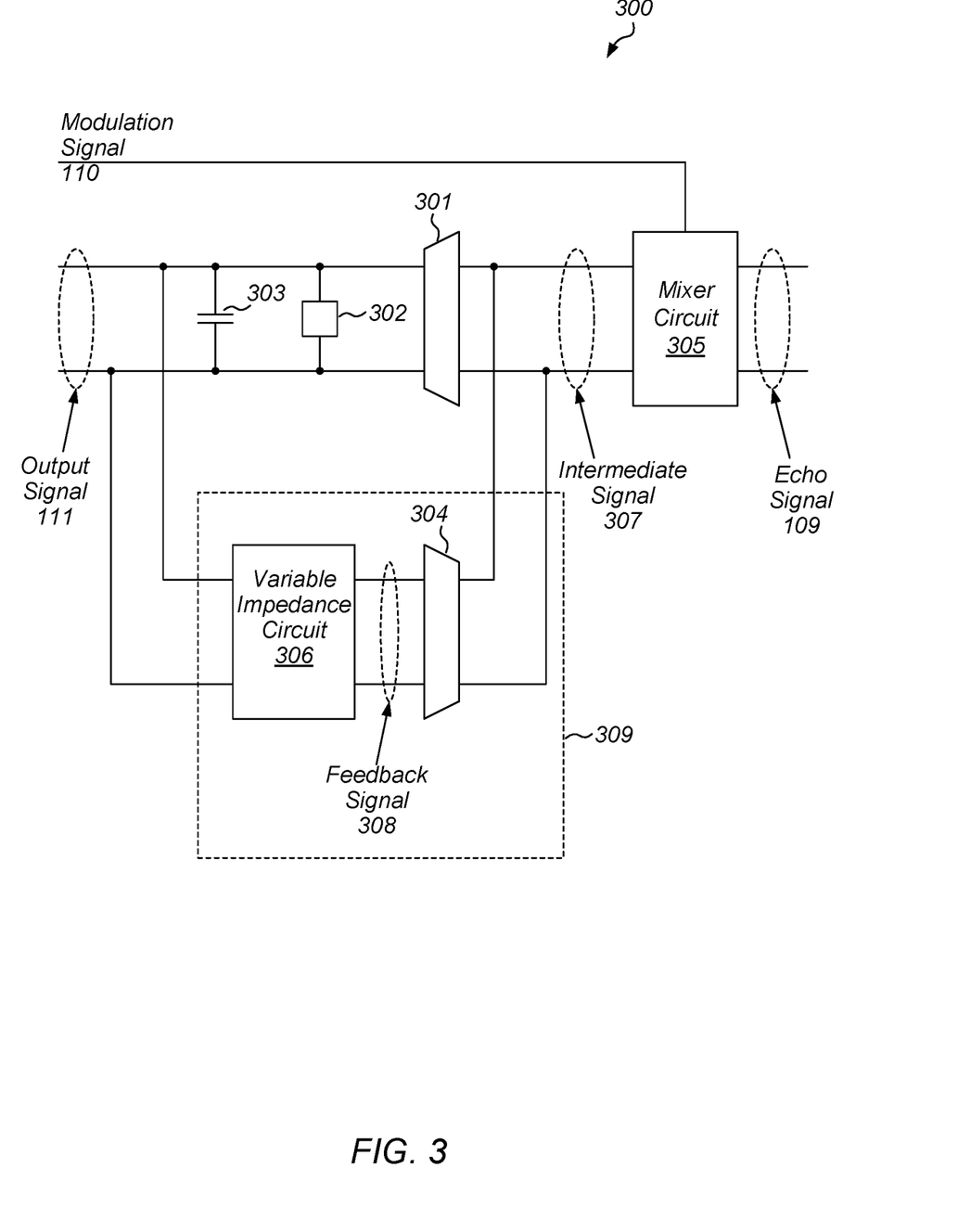
FIG. 3 illustrates a block diagram of another embodiment of a baseband amplifier circuit.

A modification of filter circuit 200 to employ a servo-based offset cancellation loop can be used to remove the tone generated by leakage. A block diagram of such a modified filter circuit is illustrated in FIG. 3. As illustrated filter circuit 300 includes amplifier circuit 301, impedance 302, capacitor 303, mixer circuit 305, and feedback circuit 309.

Amplifier circuit 301 and mixer circuit 305 are configured to operate in a similar fashion to amplifier circuit 201 and mixer circuit 204 as illustrated in FIG. 2. Additionally, impedance 302 and capacitor 303 are configured to perform similar functions to impedance 202 and capacitor 203 as depicted in FIG. 2. It is noted that in other embodiments, the combination of amplifier circuit 301, impedance 302, and capacitor 303 may employ any suitable number of amplifier circuits, impedances, and capacitors.

Feedback circuit 309 includes variable impedance circuit 306 and amplifier circuit 304. Variable impedance circuit 306 is configured to filter frequency components of output signal 111 outside a frequency band centered at a particular frequency to generate feedback signal 308. Amplifier circuit 304 is configured to amplify feedback signal 308, which is combined with intermediate signal 307 at the input of amplifier circuit 301. In various embodiments, the particular frequency may be at or near a DC frequency level. The width of the frequency band may be based on characteristics of sensor circuit 100 including, but not limited to, parasitic circuit elements within sensor circuit 100, an amount of leakage of transmit signal 108 to antenna 104, and the like.

Variable impedance circuit 306 may be designed according to one of various design styles to provide different gains in different frequency bands. For example, variable impedance circuit 306 may be configured to provide a gain>1 for signals frequency band around the particular frequency, and provide a gain<1 for signals whose frequencies are outside the frequency band. In some cases, variable impedance circuit 306 may include a resonator circuit configured to resonate at the particular frequency, thereby providing a low impedance in a frequency band around the particular frequency, and filtering output signal 111 outside the frequency band. Such a resonator circuit may include any suitable combination of inductors, capacitors, and other suitable circuit elements.

Alternatively, variable impedance circuit 306 may be a particular embodiment of an integrator circuit configured to generate feedback signal 308 such that a magnitude of feedback signal 308 is proportional to a voltage level of output signal 111 integrated over time. In some cases, Equation 1 gives the transfer function (in the Laplace domain) of such integrator circuit, where $\omega_\mu$ is the corner frequency of the integrator circuit.

$$H(s) = \frac{\omega_\mu}{s} \qquad (1)$$

In various embodiments, the integrator circuit may include an operational amplifier along with any suitable combination of passive circuit elements, such as resistors and capacitors, to perform the integration function. It is noted that although variable impedance circuit 306 and amplifier circuit 304 are depicted as separate components in feedback circuit 309, in other embodiments, amplifier circuit 304 and variable impedance circuit 306 may be combined into a single component that both filters certain frequencies and then amplifies the feedback signal.

Amplifier circuit 304 is coupled to the output of variable impedance circuit 306 and to the input of amplifier circuit 301, and is configured to amplify feedback signal 308. The output of amplifier circuit 304 is summed with intermediate signal 307 at the input to amplifier circuit 301, forming a feedback loop from output signal 111. Amplifier circuit 304 may be a particular embodiment of a differential amplifier and may include multiple transconductance elements or other gain devices. For example, amplifier circuit 301 may include MOSFETs, bipolar transistors, or other devices compatible with any other suitable semiconductor manufacturing process used to fabricate sensor circuit 100.

The feedback provided by feedback circuit 309 independently cancels offset on both the In-phase (I) and Quadrature (Q) channels of the receiver path of sensor circuit 100. Due to the transparent nature of the mixer circuit 305, one the offset due to leakage is canceled in the baseband, it is up converted at RF and directly suppressed at antenna 104 before reaching mixer circuit 305, creating a high-Q bandpass filter with a center frequency notch at antenna 104. As a result, amplifier circuit 301 and mixer circuit 305 can operate at maximum gain.

Figure 4:
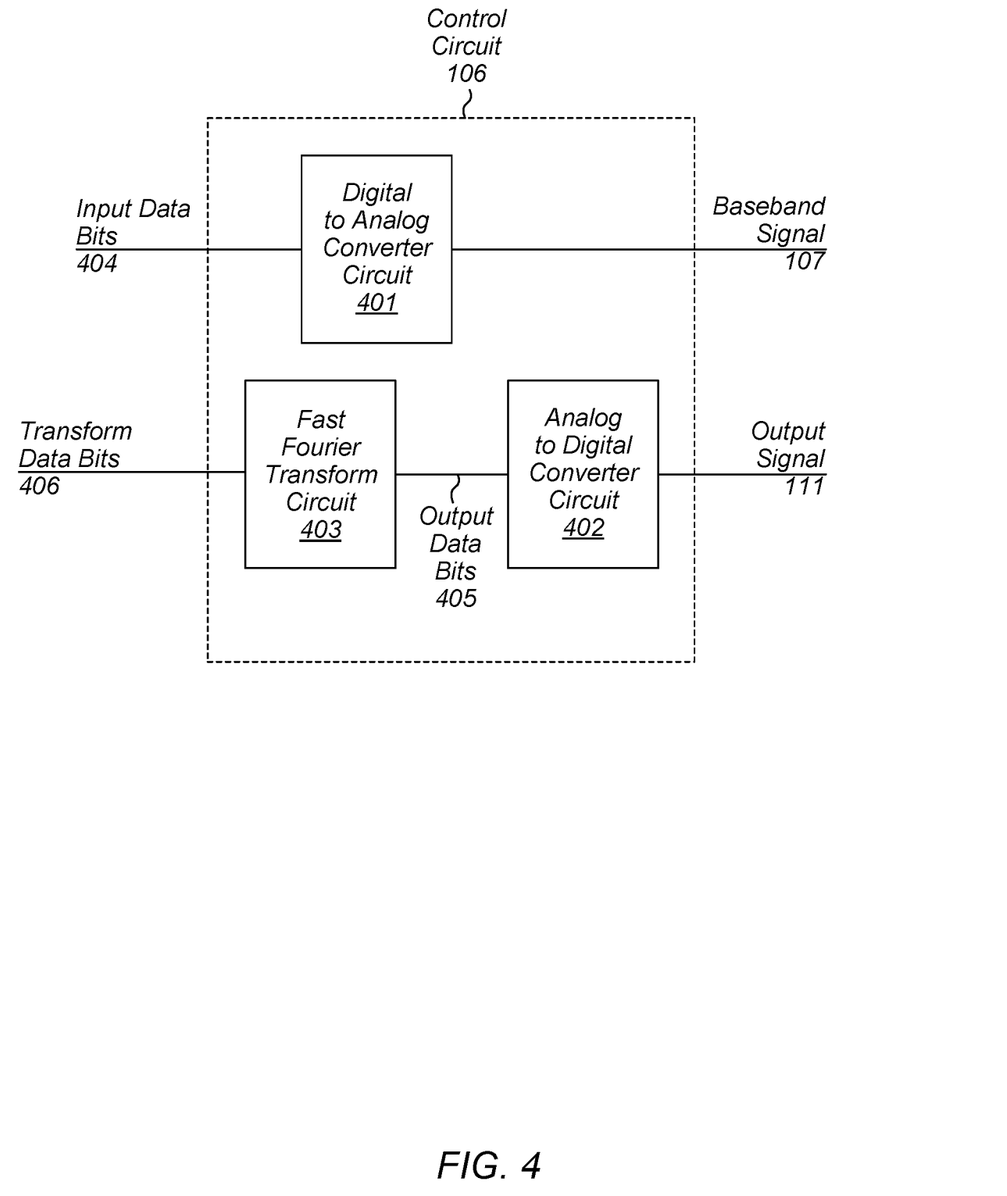
FIG. 4 illustrates a block diagram of a control circuit.

It is noted that in the embodiment illustrated in FIG. 3, variable impedance circuit 306 is coupled to output signal 111 and uses output signal 111 to generate feedback signal 308. In other embodiments, variable impedance circuit 306 may use, as input, a stream of data bits indicative of output signal 111. For example, the input variable impedance circuit may be coupled to output data bits 405, transform data bits 406 (as illustrated in FIG. 4), or any other suitable data bits derived from output signal 111. In cases where variable impedance circuit 306 uses a stream of data bits as input, variable impedance circuit 306 may include a digitalto-analog converter circuit or other suitable circuit configured to convert the stream of data bits into an analog voltage level.

A block diagram of an embodiment of control circuit 106 is illustrated in FIG. 4. As illustrated, control circuit 106 includes digital-to-analog converter circuit 401, analog-to-digital converter circuit 402, and Fast Fourier Transform circuit 403.

Digital-to-analog converter circuit 401 is configured to generate baseband signal 107 using input data bits 404. In various embodiments, a voltage level at a particular point in time of baseband signal 107 may be determined using the values of input data bits 404 at the particular point in time. In other words, digital-to-analog converter circuit 401 converts a time series of data bits into a continually varying analog signal. In various embodiments, digital-to-analog converter circuit 401 may include current or voltage sources and multiple switches configured to selectively couple the current or voltage sources to a circuit node on which baseband signal 107 propagates.

Analog-to-digital converter circuit 402 is configured to generate output data bits 405 using output signal 111. In various embodiments, analog-to-digital converter circuit 402 samples a voltage level of output signal 111 and generates a subset of output data bits 405 whose magnitude is proportional to the magnitude of the voltage level of output signal 111 at the time it was sampled. Analog-to-digital converter circuit may sample the voltage level of output signal 111 at any suitable frequency to detect variations in the voltage level of output signal 111. Analog-to-digital converter circuit 402 may be designed according to one of various design styles. For example, analog-to-digital converter circuit 402 may include multiple comparators configured to compare, at a particular sampling point, the voltage level of output signal 111 to respective voltage references levels in order to generate a subset of output data bits 405.

Fast Fourier Transform circuit 403 is configured to perform a discrete Fourier transform on output data bits 405 to convert the data from time domain data to frequency domain data. In various embodiments, the frequency domain data may be encoded in transform data bits 406, which may be used by other processing circuits (not shown) for further processing. As described below in more detail, the frequency of output signal 111 is proportional to a range of a target or object that generated echo signal 109 by reflecting the transmit signal 108. By converting output data bits 405 into the frequency domain, Fast Fourier Transform circuit 403 generates data indicative of a distance to the target or object. Fast Fourier Transform circuit 403 may, in some embodiments, be a dedicated logic circuit, which multiple logic gates, latches, flip-flop circuits, and the like. Such logic gates, latches, etc., may be arranged to implement the desired transform. Alternatively, Fast Fourier Transforms circuit 403 may be a particular embodiment of a general-purpose processor configured to perform the desired transform, in response to executing program instructions.

Figure 5:
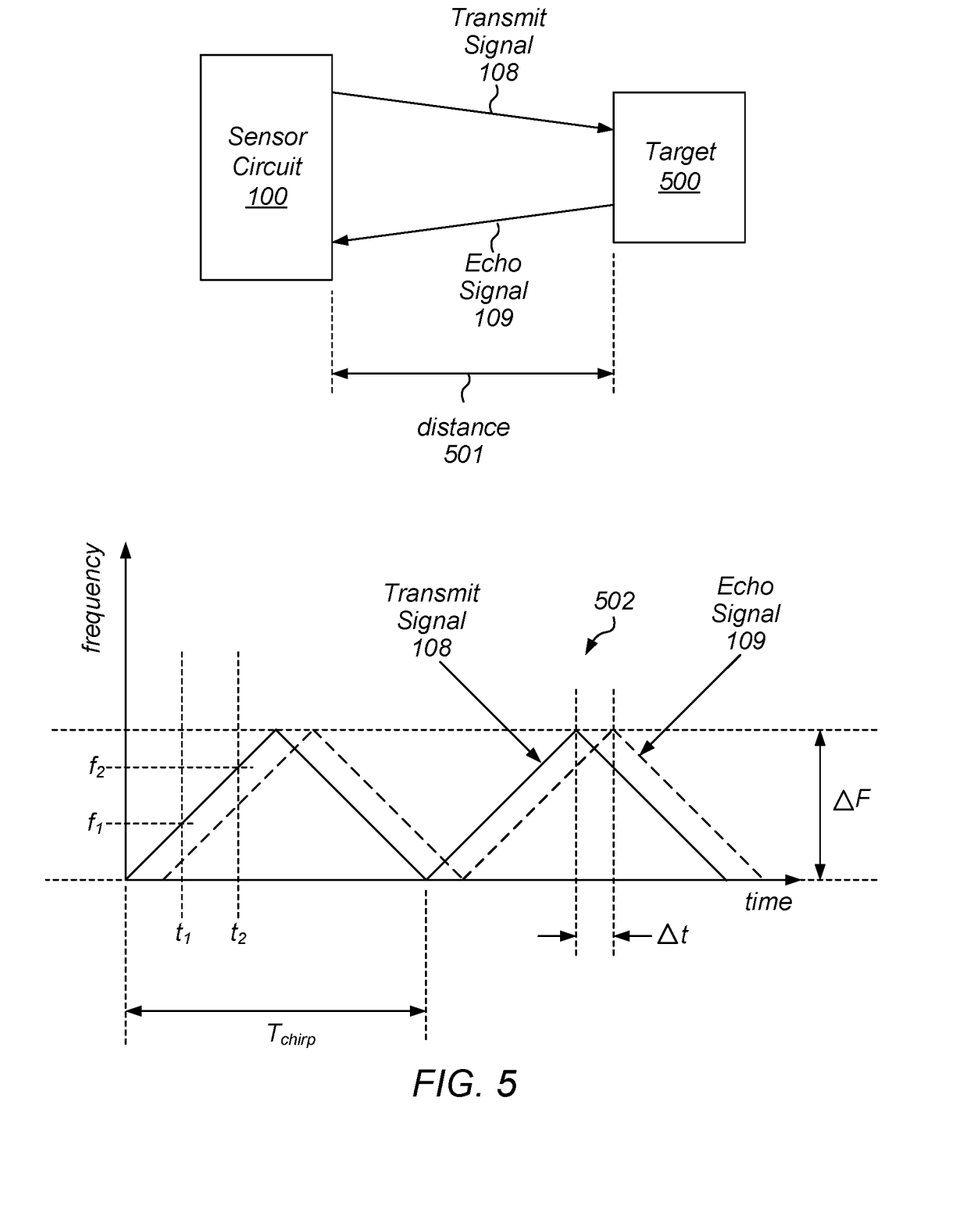
FIG. 5 illustrates example transmitted and echo waveforms.

To further illustrate how sensor circuit 100 can determine a distance to an object or target, example waveforms of transmit signal 108 and echo signal 109 are depicted in FIG. 5. As illustrated, sensor circuit 100 emits transmit signal 108, which is reflected off of target 500 to generate echo signal 109. Sensor circuit 100 is located distance 501 from target 500.

Since transmit signal 108 is modulated by modulation signal 110, the frequency of transmit signal 108, varies in time as illustrated in graph 502. For example, at time t1, the frequency of transmit signal 108 is $f_1$, while at time $t_2$, the frequency of transmit signal 108 is $f_2$.

The change in frequency of transmit signal 108 from its minimum frequency value to its maximum frequency value is given by ΔF. The period during which transmit signal 108 transitions from its minimum frequency value, to its maximum frequency value, back to its minimum frequency value is denoted by $T_{chirp}$.

As noted above, echo signal 109 is a reflected version of transmit signal 108. Due to the transit time from sensor circuit 100 to target 500, and then back to sensor circuit 100, echo signal 109 is delayed from transmit signal 108 by Δt. By knowing Δt and the speed with which transmit signal 108 and echo signal 109 propagate, e.g., the speed of light, a value for distance 501 can be determined.

Rather than trying to determine the delay in receiving echo signal 109, distance 501 can be determined based on the baseband frequency of echo signal 109 once it has been down converted and filtered. As described above, control circuit 106 can convert the down converted version of echo signal 109 from the time domain into the frequency domain using a discrete Fourier transform, thereby determining the baseband frequency. Distance 501 can then be determined using Equation 2, where $f_{BB}$ is the baseband frequency, ΔF is the difference between the maximum and minimum frequency values of transmit signal 108, $T_{chirp}$ is the period of modulation signal 110, $r_{target}$ is the distance to the target, i.e., distance 501, and c is the speed of light. In various embodiments, control circuit 106 may determine $f_{BB}$ and another circuit, e.g., a processor, may perform a calculation to determine $r_{target}$, while in other embodiments, control circuit 106 may also determine $r_{target}$ once the determination of $f_{BB}$ has been made.

$$f_{BB} = \frac{\Delta F}{T_{chirp}} \frac{2 r_{target}}{c} \qquad (2)$$

Figure 6:
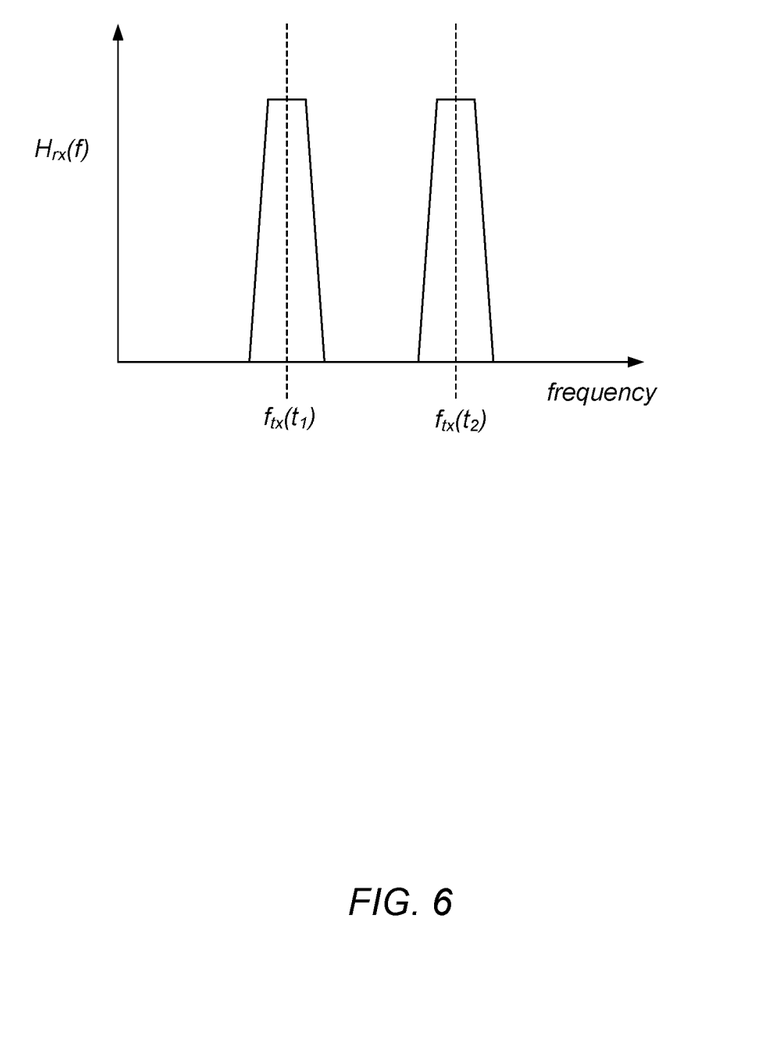
FIG. 6 illustrates example waveforms of a transfer function of a sensor circuit employing a tracking filter.

Turning to FIG. 6, an example of a transfer function associated with filter circuit 200 is illustrated. In various embodiments, the time points $t_1$ and $t_2$ may correspond to the time points illustrated in FIG. 5.

The transfer function for filter circuit 200 is shown for two different frequencies, each corresponding to a frequency of transmit signal 108 at particular point in time. For example, at time t1, $f_{rx}(t_1)$ may substantially 1 GHz, and at time t2, $f_{rx}(t_2)$ may substantially be 1.5 GHz. Accordingly, frequency range 601 would have a value of approximately 0.5 GHz. For the sake of clarity, only two time points with the corresponding two frequencies are depicted in FIG. 6. Other time points would result in additional transfer functions similar to those depicted, but centered at different frequencies corresponding to the other time points.

At frequency $f_{rx}(t_1)$, the transfer function of filter circuit 200 indicates that a frequency band centered at $f_{rx}(t_1)$ is passed and frequencies outside the band are attenuated, and at frequency $f_{rx}(t_2)$, the transfer function of filter circuit 200 indicates that a frequency band centered $f_{rx}(t_2)$ is passed and frequencies outside the band are attenuated. In various embodiments, the width of the bands may correspond to 5 MHz, or any other suitable value. As described above, the center frequency of filter circuit 200 tracks the carrier frequency of transmit signal 108, thereby eliminating the need for amplifier circuit that has to provide sufficient gain over the range of frequencies associated with transmit signal 108.

Figure 7:
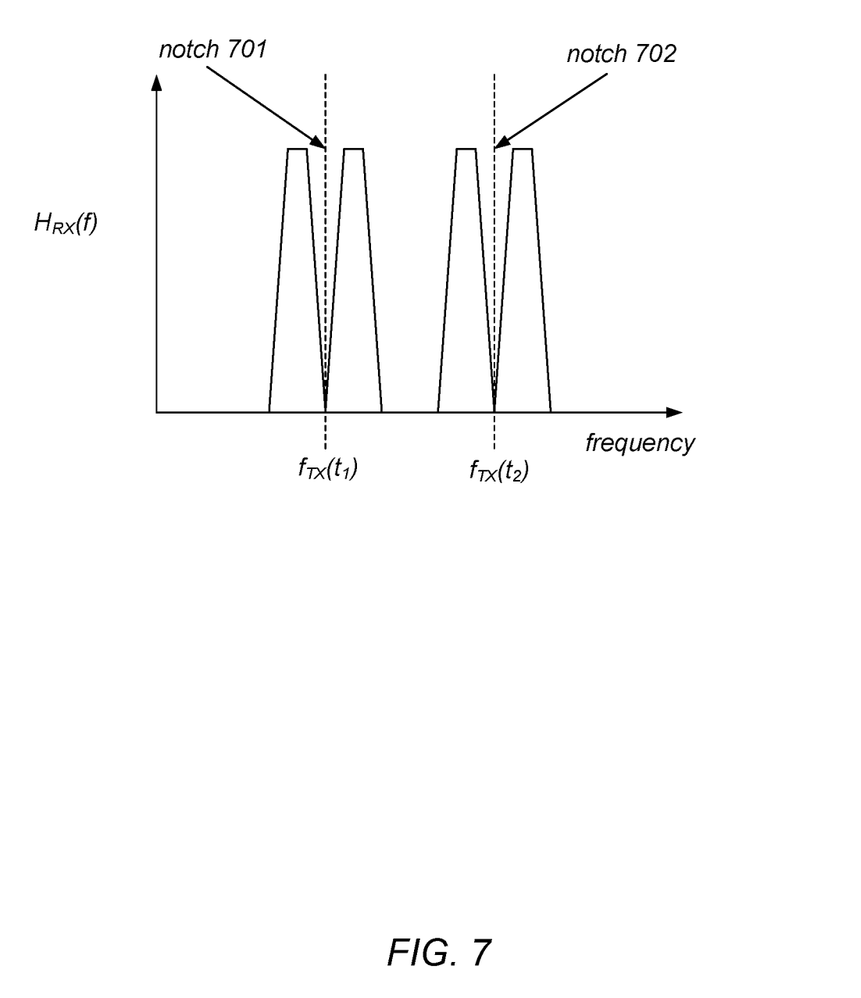
FIG. 7 illustrates example waveforms of a transfer function of a sensor circuit with leakage rejection.

Turning to FIG. 7, example waveforms illustrating a transfer function of filter circuit 300 are shown. In various embodiments, the time points $t_1$ and $t_2$ may correspond to the time points illustrated in FIG. 5.

As illustrated, example waveforms of the transfer function of filter circuit 300 are depicted for two time points. As with the transfer function depicted in FIG. 6, additional time points would show the same basic waveform appearing at difference frequencies over the range of possible frequencies of transmit signal 108.

As described above, the use of integrator circuit 306 creates notches 701 and 702 in the two transfer function responses. Each of notches 701 and 702 are at the frequency of transmit signal 108 at the corresponding point in time. The notches indicate that filter circuit 300 has little gain at $f_{tx}(t_1)$ and $f_{tx}(t_2)$ resulting in the frequency of transmit signal 108 being attenuated. By attenuating the frequency of transmit signal 108 as a function of time, leakage from antenna 103 to antenna 104 is eliminated and its contribution from the ranging calculation.

Figure 8:
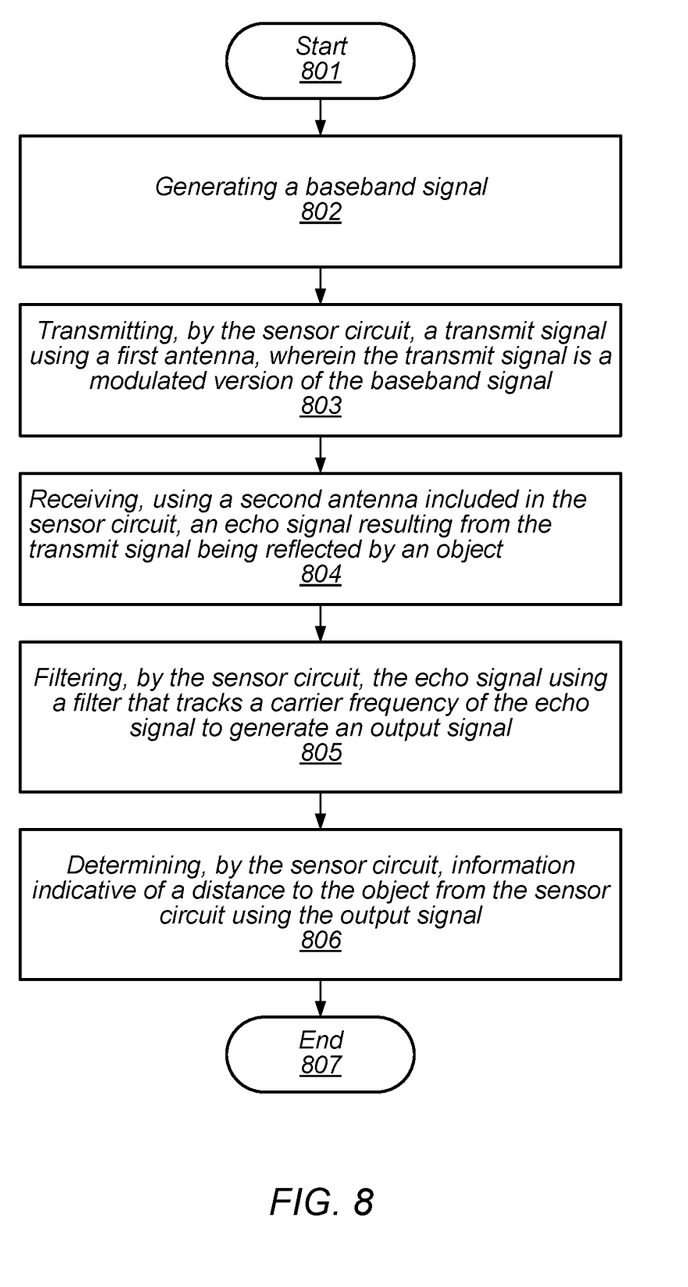
FIG. 8 illustrates a flow diagram depicting an embodiment of a method for operating a tracking filter in a sensor circuit.

Turning to FIG. 8, a flow diagram depicting an embodiment of a method for operating a sensor circuit is illustrated. The method, which begins in block 801, may be applied to sensor circuit 100 or any other suitable sensor circuit.

The method includes generating a baseband signal (block 802). In some embodiments, the method may also include generating the baseband signal using a first plurality of data bits and a digital-to-analog converter circuit. The method further includes transmitting a transmit signal using a first antenna (block 803). In various embodiments, the transmit signal may be a modulated version of the baseband signal. The method may include, in some embodiments, modulating the baseband signal using a modulation signal to generate the transmit signal.

The method also includes receiving, using a second antenna included in the sensor circuit, an echo signal resulting from the transmit signal being reflected by an object (block 804). As described above, for a particular point in time, a frequency of the echo signal may be different than a frequency of the transmit signal.

The method further includes filtering the echo signal using a filter that tracks a carrier frequency of the echo signal to generate an output signal (block 805). In various embodiments, filtering the echo signal includes down converting the echo signal using a second mixer circuit to generate an intermediate signal. As described above, down converting the echo signal includes generating a new signal, i.e., the intermediate signal, using the echo signal and the modulation signal. In some cases, the frequency of the intermediate signal is the difference of the frequency of the echo signal and the frequency of the modulation signal.

In some cases, the method includes amplifying the intermediate signal to generate the output signal. The method may include, in various embodiments, converting the output signal into a plurality of data bits using an analog-to-digital converter and determining a distance to an object that reflected the transmit signal to create the echo signal using the first plurality of data bits. In order to determine the distance, the method may include performing a Fast Fourier Transform algorithm on the plurality of data bits.

In some embodiments, filtering the echo signal includes rejecting at least one frequency component of the echo signal generated by the second antenna directly receiving the transmit signal from the first antenna. As described above, the proximity of the first and second antennas can result in the second antenna receiving the transmit signal directly from the first antenna. This can result in incorrect calculation of the distance to the object responsible for the generation of the echo signal.

The method further includes determining, by the sensor circuit, information indicative of a distance to the object from the sensor circuit using the output signal (block 806). In some cases, the method further includes determining, by a processor circuit, a value of the distance to the object using the information. The method concludes in block 807.

Figure 9:
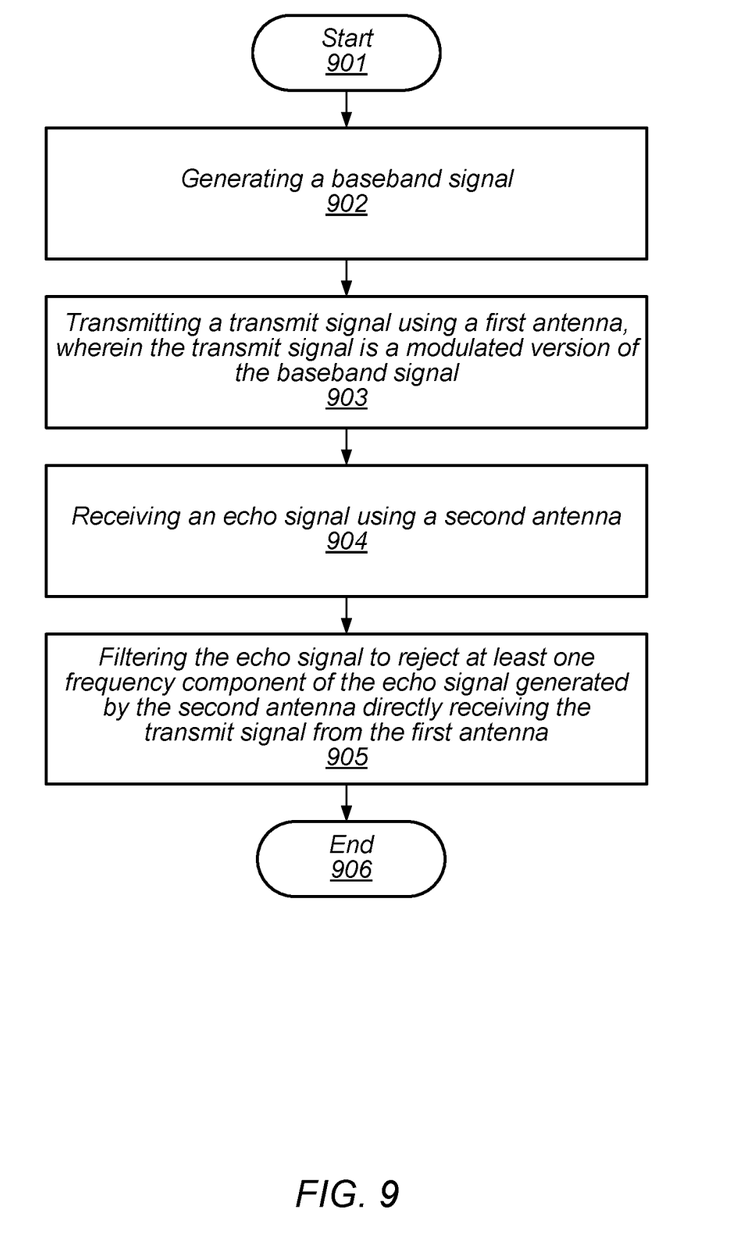
FIG. 9 illustrates a flow diagram depicting an embodiment of a method for operating a radio frequency sensor circuit with leakage rejection.

Turning to FIG. 9, a flow diagram depicting an embodiment of another method for operating a sensor circuit is illustrated. The method, which begins in block 901, may be applied to sensor circuit 100 or any other suitable sensor circuit.

The method generating a baseband signal (block 902). As described above, the method may include generating the baseband signal from a first plurality of data bits using a digital-to-analog converter circuit. The method also includes transmitting a transmit signal using a first antenna (block 903). In various embodiments, the transmit signal may be modulated version of the baseband signal. As described above, a mixer circuit may be employed to modulate the baseband signal to generate the transmit signal.

The method further includes receiving an echo signal using a second antenna (block 904). Once the echo signal has been received, the method includes filtering the echo signal to reject at least one frequency component of the echo signal. In various embodiments, the at least one frequency component is generated by the second antenna directly receiving the transmit signal from the first antenna. By filtering the at least one frequency component, determining the distance to the object that reflected the transmit signal to generate the echo signal can be improved. The method concludes in block 905.

Figure 10:
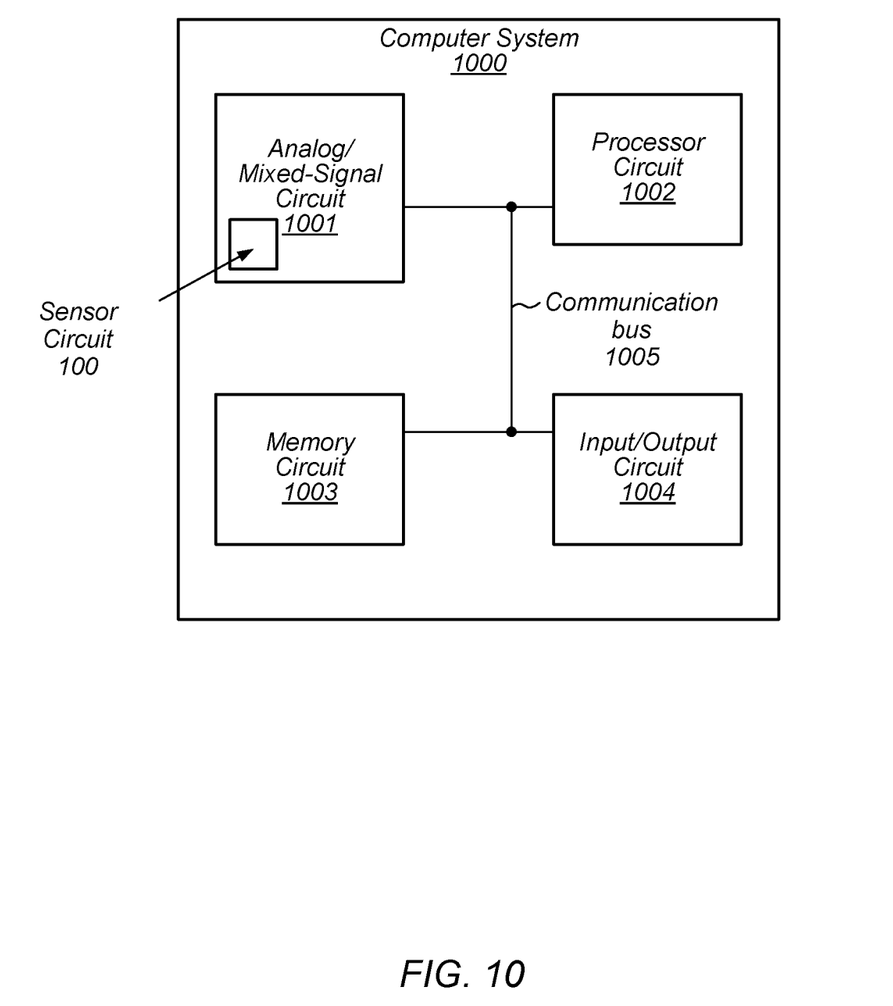
FIG. 10 is a block diagram of one embodiment of a computer system that includes a power generator circuit.

A block diagram of computer system is illustrated in FIG. 10. As illustrated embodiment, the computer system 1000 includes analog/mixed-signal circuits 1001, processor circuit 1002, memory circuit 1003, and input/output circuits 1004, each of which is coupled to communication bus 1005. In various embodiments, computer system 1000 may be a system-on-a-chip (SoC) and be configured for use in a desktop computer, server, or in a mobile computing application such as, a tablet, laptop computer, or wearable computing device.

Analog/mixed-signal circuits 1001 includes a variety of circuits includes sensor circuit 100. Additionally, analog/mixed-signal circuits 1001 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 1001 may be configured to perform power management tasks with the inclusion of on-chip power supplies and voltage regulators.

Processor circuit 1002 may, in various embodiments, be representative of a general-purpose processor that performs computational operations. For example, processor circuit 1002 may be a central processing unit (CPU) such as a microprocessor, a microcontroller, an application-specific integrated circuit (ASIC), or a field-programmable gate array (FPGA).

Memory circuit 1003 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that in the embodiment of a computer system in FIG. 10, a single memory circuit is depicted. In other embodiments, any suitable number of memory circuits may be employed.

Input/output circuits 1004 may be configured to coordinate data transfer between computer system 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol.

Input/output circuits 1004 may also be configured to coordinate data transfer between computer system 1000 and one or more devices (e.g., other computing systems or integrated circuits) coupled to computer system 1000 via a network. In one embodiment, input/output circuits 604 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1004 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a first antenna and a second antenna;
a control circuit configured to generate a baseband signal;
a transmitter circuit configured to transmit, via the first antenna, a transmit signal that is a modulated version of the baseband signal; and
a filter circuit that includes:
a mixer circuit coupled to the second antenna, wherein the mixer circuit is configured to down convert, using a modulation signal, an echo signal to generate an intermediate signal; and
an amplifier circuit configured to amplify the intermediate signal to generate an output signal; and
wherein the echo signal is a reflected version of the transmit signal.

2. The apparatus of claim 1, wherein the transmitter circuit is further configured to generate the transmit signal using the modulation signal.

3. The apparatus of claim 2, wherein the filter circuit further includes an impedance matching network coupled between output nodes of the amplifier circuit, wherein the impedance matching network is configured to match an input impedance of the amplifier circuit to an input impedance of a load circuit.

4. The apparatus of claim 3, wherein the control circuit is further configured to:
generate a plurality of data bits using the output signal; and
determine, using the plurality of data bits, information indicative of a distance to an object that reflected the transmit signal to create the echo signal.

5. The apparatus of claim 3, wherein the filter circuit is configured to reject at least one frequency component of the echo signal resulting from the second antenna directly receiving the transmit signal from the first antenna.

6. The apparatus of claim 5, wherein the filter circuit is further includes:
a variable impedance circuit configured to attenuate one or more frequency components of the output signal to generate a feedback signal, wherein the one or more frequency components are outside of a frequency band centered at a particular frequency; and
a second amplifier circuit configured to amplify the feedback signal and combine an amplified version of the feedback signal with the intermediate signal.

7. A method, comprising:
generating a baseband signal by a sensor circuit;
transmitting, by the sensor circuit, a transmit signal using a first antenna, wherein the transmit signal is a modulated version of the baseband signal;
receiving, using a second antenna included in the sensor circuit, an echo signal resulting from the transmit signal being reflected by an object;
down converting, by a mixer circuit included in the sensor circuit, the echo signal using a modulation signal to generate an intermediate signal, wherein the mixer circuit is coupled to the second antenna;
amplifying the intermediate signal to generate an output signal; and
determining, by the sensor circuit, information indicative of a distance to the object from the sensor circuit using the output signal.

8. The method of claim 7, further comprising generating the modulated version of the baseband signal using the modulation signal.

9. The method of claim 7, wherein determining the information indicative of the distance to the object includes converting the output signal into a first plurality of data bits using an analog-to-digital converter.

10. The method of claim 9, further comprising determining the distance to the object using the first plurality of data bits.

11. The method of claim 9, wherein down converting the echo signal includes rejecting at least one frequency component of the echo signal generated by the second antenna directly receiving the transmit signal from the first antenna.

12. The method of claim 11, wherein rejecting at least one frequency component of the echo signal includes filtering one or more frequency components of the output signal to generate a feedback signal and combining the feedback signal with the intermediate signal.

13. The method of claim 7, further comprising, generating the baseband signal using a first plurality of data bits and a digital-to-analog converter circuit.

14. An apparatus, comprising:
a control circuit configured to generate a baseband signal;
a transmitter circuit configured to transmit, via a first antenna, a transmit signal that is a modulated version of the baseband signal;
a first mixer circuit coupled to a second antenna, wherein the first mixer circuit configured to down convert, using a modulation signal, an echo signal to generate an intermediate signal; and
an amplifier circuit configured to:
    amplify the intermediate signal to generate an output signal; and
    modify the intermediate signal using a version of the output signal that is filtered outside of a frequency band centered at a particular frequency.

15. The apparatus of claim 14, wherein the control circuit is further configured to generate the baseband signal using a first plurality of data bits.

16. The apparatus of claim 14, further comprising, a second mixer circuit configured to modulate the baseband signal using the modulation signal to generate the transmit signal.

17. The apparatus of claim 16, wherein the first mixer circuit is further configured to combine the echo signal with the modulation signal to generate the intermediate signal.

18. The apparatus of claim 14, wherein the control circuit includes an analog-to-digital converter circuit configured to generate a second plurality of data bits using the output signal.

19. The apparatus of claim 18, wherein the control circuit is further configured to determine, using the second plurality of data bits, information indicative of a distance to an object that reflected the transmit signal to create the echo signal.

\* \* \* \* \*